United States Patent [19]

Hodapp

[11] Patent Number: 4,467,872
[45] Date of Patent: Aug. 28, 1984

[54] TELESCOPING ROW MARKER

[75] Inventor: Gary D. Hodapp, Mankato, Minn.

[73] Assignee: Hiniker Company, Mankato, Minn.

[21] Appl. No.: 323,275

[22] Filed: Nov. 20, 1981

[51] Int. Cl.³ .............................................. A01B 17/00
[52] U.S. Cl. .................................................... 172/126
[58] Field of Search ............... 172/126, 130, 131, 132, 172/127, 128, 129, 667, 476, 311, 456

[56] References Cited

U.S. PATENT DOCUMENTS

| | | | |
|---|---|---|---|
| 2,962,103 | 11/1960 | Hansen | 172/126 |
| 3,250,333 | 5/1966 | Day | 172/126 |
| 3,666,019 | 5/1972 | Yeske | 172/130 |
| 3,736,990 | 6/1973 | Rogers | 172/131 |
| 3,766,987 | 10/1973 | Orthman | 172/126 |
| 3,833,066 | 9/1974 | Hitt | 172/131 |
| 3,841,413 | 10/1974 | Applewhite | 172/476 |
| 3,880,240 | 4/1975 | Jarrett | 172/131 |
| 4,207,950 | 6/1980 | Kinzenbaw | 172/126 |

FOREIGN PATENT DOCUMENTS 1095769  2/1981  Canada .................................. 172/311

Primary Examiner—Richard J. Johnson
Attorney, Agent, or Firm—Emrich, Lee, Brown & Hill

[57] ABSTRACT

A telescoping row marker for use with a conventional agricultural tillage apparatus such as a tractor carried, or pulled, planter, cultivator or the like; for the alignment of soil working implements with crop rows is disclosed. Positioned within a hollow mounting bar open at both ends are first and second telescoping marker arms having marking means attached to the distal ends and engageable track means located along the length thereof. Positioned adjacent respective ends of the mounting bar are first and second drive means engaging the track means of an adjacently positioned marker arm for displacing the marker arms along the hollow mounting bar whereby the marker arms may be fully extended in the working position or may be fully retracted for transporting or maneuvering the tillage apparatus. Intermediate marker arm positions are available to accommodate various row widths with each marker arm including a vertically hinged portion to allow for free marker vertical displacement for contour following and in the event of impact with an obstacle. In addition, each arm includes a horizontally hinged shear pin coupling to permit the horizontal breakaway of the arm upon impact with large obstructions such as rocks or trees. The marker arm drive means may be operated from the tractor's hydraulic system with independent control of each marker arm provided.

13 Claims, 4 Drawing Figures

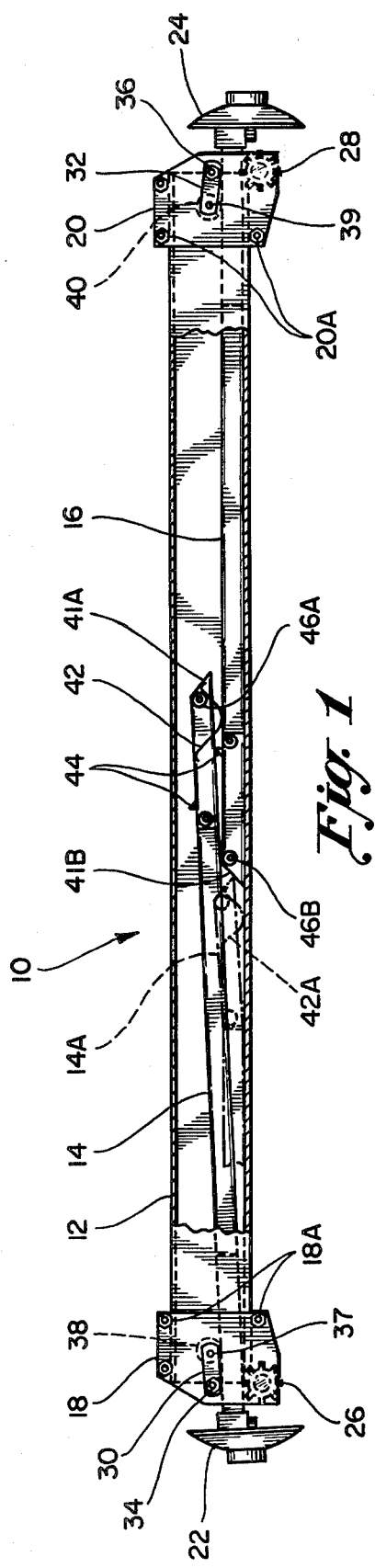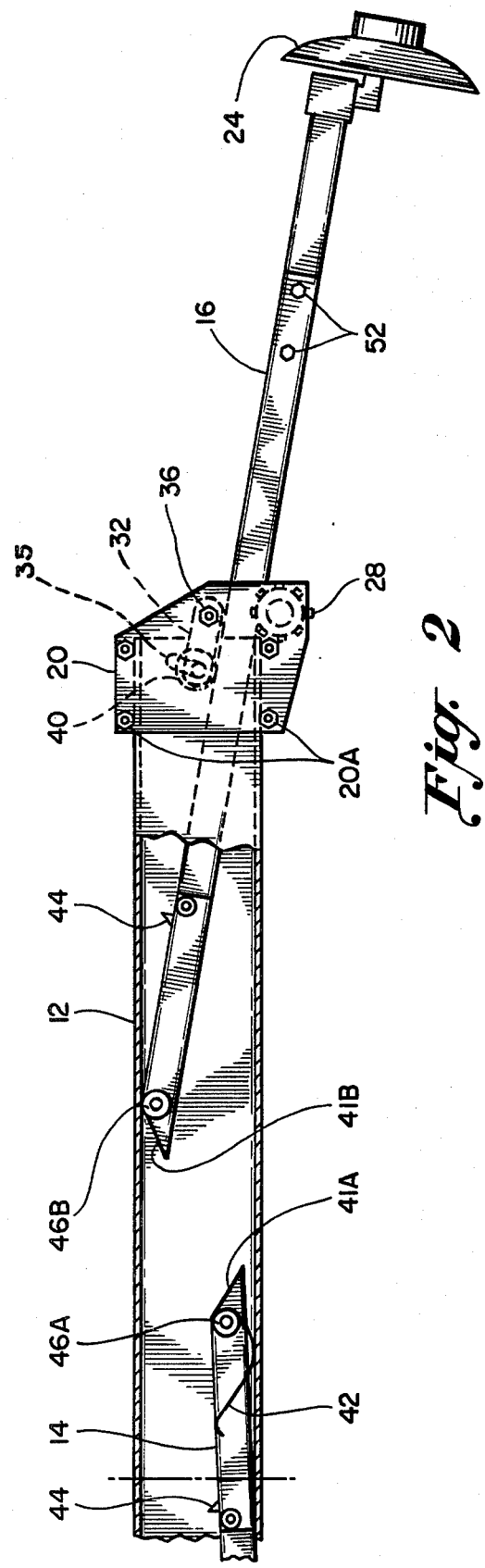

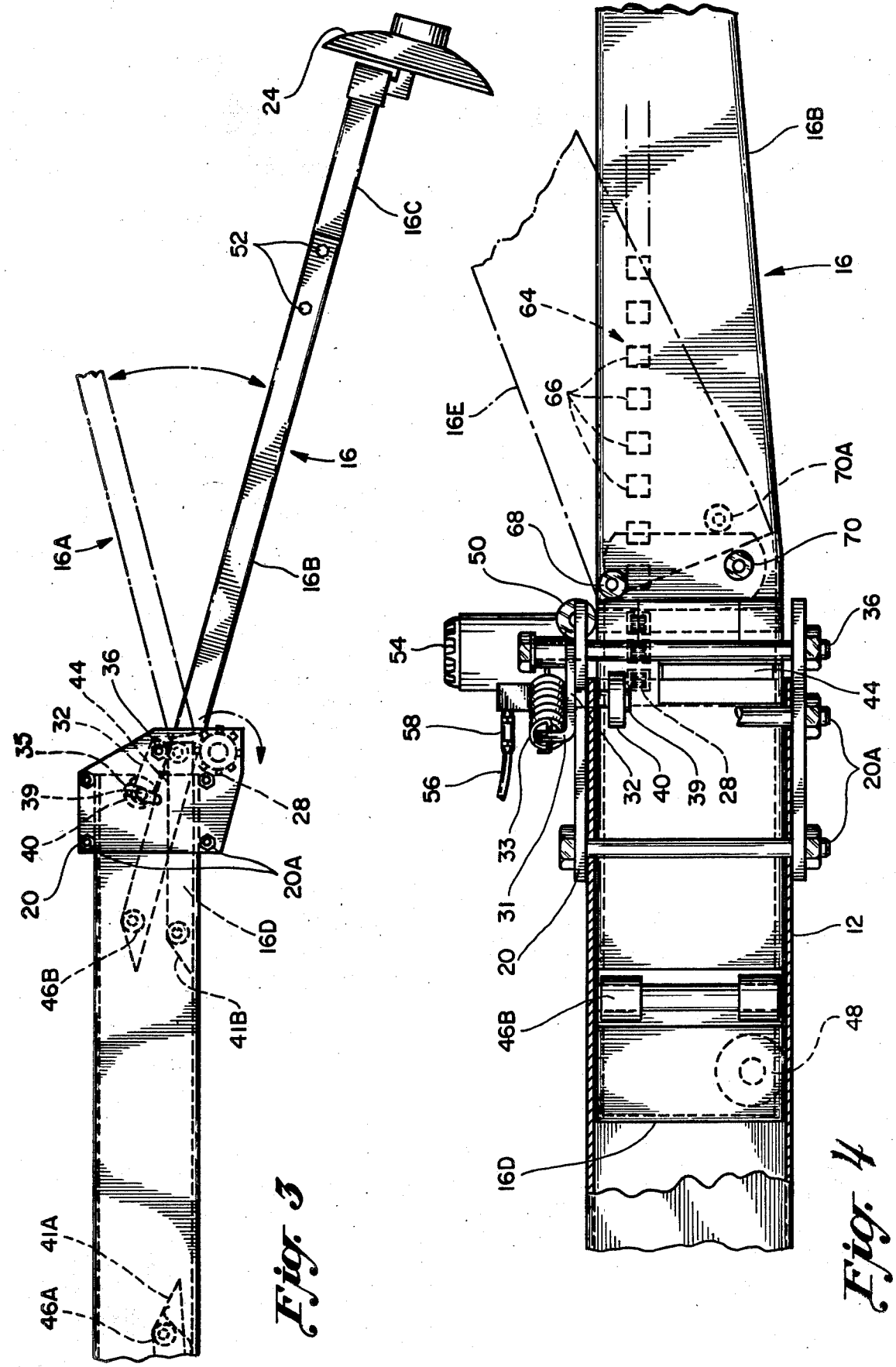

TELESCOPING ROW MARKER

BACKGROUND OF THE INVENTION

This invention relates generally to row marking apparatus for agricultural implements and particularly relates to an improved row marker for a multi-row planter or cultivator for the accurate positioning of ground working implements relative to crop rows.

In a conventional agricultural tillage apparatus such as a cultivator or planter, a pair of row markers are generally provided. These row markers project laterally from opposite sides of the tractor or frame to which the soil working implements are mounted. Each row marker may be moved between an extended or use position and a retracted storage or road travel position. In the use position, a row marker provides a visible indication for guiding the operator in subsequent passes of the implement over the field being worked. The positioning mark is generally made in the soil by a disc-like member positioned at the distal end of the row marker arm. In general, the markers on opposite sides of the tractor are alternately utilized with the inactive marker in the storage position so as not to contact the soil while the other marker is engaging the soil.

Early row marker systems employed two sets of cables for individually controlling each marker arm. This approach was later replaced with hydraulic control systems in which the tractor's hydraulic system energized a cylinder arrangement for the extension or retraction of the marker arms. The marker arms themselves are generally of a hinged nature having an inner and outer section, with the proximal end of the inner section hinged to the implement-carrying apparatus and its distal end pivotally coupled to the proximal end of the outer section. When the implement is being transported to and from the working area, the hinged marker arm is stored in a flexed position with the various sections generally oriented vertically.

Prior art row marker systems suffer from various operating limitations. One of the primary disadvantages of these systems relates to the transportability and maneuverability of the implement carrying apparatus or tractor, as the case may be. Even in the fully retracted position, these systems generally project laterally outward from the supporting structure, increasing the overall width of the tillage apparatus. In addition, in the retracted position the flexible marker arms extend a considerable height above the tractor and implement carrying structure requiring that the row marker system be removed from the structure to which it is mounted prior to storage unless the storage structure is provided with an over-sized access door. With increasing tillage implement size, marker arm length has correspondingly increased requiring even larger access openings to accommodate current marker arm assemblies.

Another disadvantage of prior art marker arm systems involves the use of complicated arrangements of cables or chains for lowering and raising the marker assemblies. Variations in ground contour and the resulting upward and downward movement of the marker arm assemblies frequently cause the chains or cables to jump from the drive rollers or sprockets with which they are engaged. If the cables or chains are maintained under considerable tension when the marker arm is in the down position so as to avoid this problem, the ability of the marker arm assembly to follow low spots in ground contour by virtue of gravity action is considerably limited.

The increasing size of marker arm assemblies has increased the susceptibility of these systems to damage. For example, impact with a rock of a row marker coupled to a heavier marker arm is more likely to cause damage to the marker itself and/or the arm assembly due to the increased inertia of the entire mechanism. A lighter row marking implement will be more easily deflected by the obstruction and less likely to be damaged thereby. The alternative, of course, is to raise the marker arm prior to impact with an obstruction, but this frequently necessitates raising all of the soil working implements thus interrupting the cultivating process. Even if the position of the row marker is controllable independent of that of the soil working implements, this requires the operator, who already has a number of important functions to perform including that of monitoring the status of the working implements, to be diligent in terms of anticipating impact of the row marker with an obstruction, which in many cases may lie concealed under the surface of the soil. In addition, when the implement carrying assembly is lowered rapidly, the marker arm will also be lowered rapidly and in many cases, for all practical purposes, will fall freely. When working fairly hard soil, if the marker arm falls freely impact between the mark forming means and the ground is considerable. This high impact in some cases may actually result in the bending of the marker arm structure. The thinner, longer marker arm assemblies currently in use are even more susceptible to positioning impact with hard soil.

The present invention is intended to avoid the aforementioned performance limitations of prior art agricultural row markers by providing a row marker system which is more easily and safely transported, provides ground contour following, is highly reliable, and reduces the hazards of an unwieldy, cable - or chain-operated row marker system.

SUMMARY OF THE INVENTION

Accordingly, it is an object of the present invention to provide an improved crop row marker for use with a conventional agricultural tillage system offering enhanced reliability and improved tillage system transportability and maneuverability.

The foregoing features of the present invention are achieved by means of a telescoping row marker system coupled to a hollow support member, such as a tool bar, of a conventional agricultural tillage system. First and second marker arms are movably positioned lengthwise within the open-ended hollow support member and include engageable tracks on the surface thereof. Attached to the distal end of each marker arm is a conventional marker element such as a concave marking disc. First and second drive means, such as hydraulic motor driven sprockets, located at each open end of the support member, engage the tracks of each marker arm and permit the marker arms to be individually or simultaneously displaced from a fully retracted transport position wherein only the marker elements extend from the hollow support member to a fully extended working position with only the proximal ends of the marker arms positioned within the hollow support member. Intermediate marker positions between the fully retracted and fully extended positions are also available to accommodate various row widths. Each marker arm includes a doubly hinged portion located toward the proximal end thereof which provides for the upward and/or rearward displacement of the distal portion of the marker arm upon impact with an obstruction, such as a rock, thus avoiding row marker damage or destruction.

BRIEF DESCRIPTION OF THE DRAWINGS

The appended claims set forth those novel features believed characteristic of the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

FIG. 1 shows a partially cut away front view of a telescoping row marker in accordance with the present invention with the right and left telescoping marker arms in the fully retracted position;

FIG. 2 shows a partially cut away front view of an end portion of the telescoping row marker of the present invention with one telescoping marker arm in the fully retracted position and the other telescoping marker arm in a partially extended position;

FIG. 3 is a partially cut away front view of an end portion of a telescoping row marker in accordance with the present invention wherein one marker arm is in the fully retracted position and the other marker arm is in the fully extended position, which marker arm is also shown in phantom in an upward displaced position; and FIG. 4 is a partially cut away close-up top view of an end portion of the telescoping row marker of the present invention with the marker arm illustrated therein depicted in the fully extended position and wherein the rearward displacement of the marker arm is shown in phantom.

DETAILED DESCRIPTION OF THE PREFERRED EMBODIMENTS

Referring to FIG. 1, there is shown a partially cut away front view of a telescoping row marker 10 in accordance with the present invention. A hollow support member, such as a tool bar, 12 is mounted to the frame of a tillage system in a generally horizontal direction and transverse to the direction of motion of the tillage system during operation. Such tillage systems generally have a plurality of horizontal hollow support members for mounting soil working implements thereupon. The present invention may be positioned within any one of these support, or mounting, bars, requiring only a minimum length on each open end of the support member for accommodating row marker drive and guide displacement means. The crosswise support member, which is commonly known as a tool bar, may be incorporated in a larger structure to which a plurality of soil working implements may be mounted or it may be individually mounted to and supported by the towing vehicle, such as a tractor.

The telescoping row marker system 10 generally includes right and left marker arms 14, 16 to which are coupled on the distal ends thereof right and left marker elements 22, 24. FIG. 1 shows the marker arms 14, 16 in the fully retracted position within hollow support member, or tool bar, 12. As shown in FIG. 1, the right marker arm 14 is moved toward the left and the left marker arm 16 is moved toward the right when retracted. The manner in which the marker arms are moved during extension and retraction is discussed in detail below.

The proximal ends of right and left telescoping marker arms 14, 16 respectively include inclined portions 41A, 41B. During the simultaneous retraction of both marker arms or individual marker arm retraction, the inclined proximal end 41B of left marker arm 16 contacts the lower edge of the proximal end 41A of right marker arm 14. The proximal end of right marker arm 14 is maintained in a slightly raised position from the lower, inner surface of hollow tool bar 12 by means of a spring 42 fixedly mounted to the proximal end of the right marker arm 14 by means of roller assembly 46A. The elevated position of the proximal end 41A of right marker arm 14 causes it to be deflected up the inclined surface of the proximal end 41B of left marker arm 16. This allows right and left marker arms 14, 16 to be positioned in an overlapping orientation in the fully retracted position thus not limiting maximum marker arm length to one-half the length of the hollow tool bar 12.

In the fully retracted position, with right marker arm 14 positioned above and resting upon left marker arm 16, spacers 44 are provided on the upper surfaces of the proximal portions of both marker arms for providing a firm support for the other marker arm in the retracted position. This reduces vibration and wear during transport of the telescoping row marker system with the marker arms in the fully retracted position.

Mounted to the right and left open ends of hollow support member 12 by means of nut and bolt combinations 18A, 20A respectively are right and left mounting plates 18, 20. Mounting plates 18, 20 include an aperture which is aligned and continuous with the adjacent open end of support member 12. Thus, right marker arm 14 extends through the aperture of right mounting plate 18 while left marker arm 16 extends through the aperture of left mounting plate 20.

Mounted on the lower, outer portions of right and left mounting plates and positioned therein are right and left drive sprockets 26, 28, respectively. Each drive sprocket has a plurality of teeth on the perimeter thereof which engage and are inserted in the apertures 66 of linear drive track 64 as shown with regard to left marker arm 16 in FIG. 4. Right marker arm 14 has a similar drive track on its lower surface which similarly is engaged by the teeth of right drive sprocket 26. With the respective drive tracks located on the lower surfaces of right and left marker arms 14, 16, the weight of the respective marker arm causes the teeth of the corresponding drive sprocket to engage the apertures of the adjacent drive track in a one-to-one relationship such that rotation of a drive sprocket results in the linear displacement of the corresponding marker arm. Thus, the clockwise rotation of left drive sprocket 28 will move left marker arm 16 toward the extended position, while counterclockwise rotation of drive sprocket 28 will displace left marker arm 16 toward the retracted position in tool bar 12. The operation and structure of the marker arm drive mechanism utilized in a preferred embodiment of the present invention is discussed in greater detail below with reference to FIG. 4. However, the present invention is not limited to the use of a sprocket-type drive mechanism, but may make use of any conventional drive mechanism such as a friction-type roller drive.

Referring to FIGS. 1 and 4, right and left hinged bar guides 30, 32 are pivotally mounted on right and left mounting plates 18, 20 by means of right and left pivot bolts 34, 36, respectively. Pivot bolts 34, 36 are coupled to one end of their respective hinged bar guides 30, 32 while to the other end thereof are mounted right and left roller support shafts 37, 39, respectively. Roller support shafts 37, 39 extend through apertures 35 in their respective, adjacent mounting plates 18, 20 and are rotationally coupled to right and left guide rollers 38, 40. Guide rollers 38, 40 are therefore positioned within the respective apertures of right and left mounting brackets 18, 20, and in rotational contact with an upper surface of right and left arms 14, 16 respectively. The details of structure and operation relating to left marker arm 16 shown in Figs. 3 and 4 and described herein are equally applicable to right marker arm 14, but in order to avoid unnecessary repetition, a detailed description relating to the latter is omitted herefrom.

Each bar guide includes a lateral extension 31 located adjacent the end to which the corresponding roller support shaft 39 is mounted, as shown for the left hinged bar guide 32 in FIG. 4. Bar guide extension 31 projects outward from the adjacent mounting plate 20 and is coupled to one end of a hold-down spring 33. The other end of hold-down spring 33 is coupled by conventional means (not shown) to a lower portion of mounting plate 20. The downward tension applied by means of hold-down spring 33 to bar guide extension 31 is transmitted via guide roller support shaft 39 to the adjacent guide roller 40. Guide roller 40 thus rotationally engages an upper surface of left marker arm 16 and limits the vertical displacement of the distal section 16C of that marker arm when it is extended or retracted in tool bar 12. In addition, this downward force applied to left marker arm 16 ensures the engagement of the teeth in drive sprocket 28 with the apertures 66 of linear drive track 64. Roller assembly 46B provides a counter-balance force for the extended portion of left marker arm 16, and permits the marker arm to be simultaneously extended and lowered thus avoiding the sudden dropping of marker element 24 to the ground when marker arm 16 is extended. In addition, the vertical displacement of left marker arm 16 upon impact with an obstacle is damped by means of roller assembly 46B. Similar functions are performed by roller assembly 46A with respect to right marker arm 14. Thus, the impact force between the ground and the downward moving marker arm following marker element impact with an obstacle is reduced as is the possibility of damage thereto as a result of such impact. Finally, right and left guide rollers 38, 40 not only guide respective marker arms 14, 16 during the extension/lowering and retraction/raising thereof, but also facilitate the displacement of respective marker arms providing an easily moved surface along which the marker arms may be translationally displaced.

Roller assemblies 46A and 46B not only facilitate the relative motion of the marker arms when in contact with one another in the overlaid configuration when retracted as shown in FIG. 1, but also rotationally engage the upper inner surface of tool bar 12 in smoothly guiding the proximal ends of the marker arms thereacross during extension and retraction. Lateral roller assembly 48 and mounting plate roller 50 are shown in FIG. 4. Lateral roller assembly 48 is positioned adjacent the proximal end of left marker arm 16 and extends from a lateral surface thereof in rotationally engaging an adjacent lateral surface of tool bar 12. Mounting plate roller 50 is also oriented vertically and rotationally positioned on left mounting plate 20 so as to rotationally engage a lateral surface of left marker arm 16. By positioning lateral roller assembly 48 and mounting plate roller 50 immediately adjacent facing lateral surfaces of tool bar 12 and left marker arm 16, these roller assemblies act as horizontal guides for the marker arm during its retraction and extension in insuring the linear displacement of the marker arm within tool bar 12. Although not shown, rollers corresponding to lateral roller assembly 48 and mounting plate roller 50 are similarly positioned on right marker arm 14 and right mounting plate 18, respectively.

Referring to FIG. 4, left drive sprocket 28 is coupled to a bidirectional hydraulic motor 54 by means of a shaft (not shown) in a conventional manner. Hydraulic motor 54 is, in turn, actuated by a source of hydraulic pressure transmitted to hydraulic motor 54 via line 56 and coupling 58. Generally, two hydraulic lines are coupled to bidirectional hydraulic motor 54, one providing hydraulic pressure in one direction for operating the motor in a first rotational direction and the second line providing hydraulic pressure in a second direction for operating the motor in the opposing rotational direction. Only one hydraulic line coupled to hydraulic motor 54 is shown in FIG. 4 in order to avoid unnecessary detail in the drawing and because this does not form a part of the present invention. A second hydraulic motor (not shown) is coupled to right drive sprocket 26 in a similar manner and includes similar associated installation provisions. The present invention is not limited to operation with a bi-directional hydraulic motor, but is adapted for implementation with any conventional bi-directional drive means such as an electric motor.

In a preferred embodiment of the present invention, although not necessary for its operation, each marker arm includes a proximal section 16D, an intermediate section 16B, and a distal section 16C, as shown with respect to left marker arm 16 in FIG. 3. The cross-sectional dimensions of intermediate section 16B and distal section 16C are such that one fits within the other. In a preferred embodiment distal section 16C is positioned within intermediate section 16B in a sliding manner. Incorporated in facing and opposite surfaces of intermediate and distal sections 16B, 16C are bolt holes (not shown) through which bolts 52 are inserted in fixedly coupling the two sections. By incorporating a plurality of apertures in a linear array along the length of distal section 16C, aligning selected apertures in distal section 16C with the apertures of intermediate section 16B, and positioning bolts 52 in the thus aligned apertures, the length of left marker arm 16 may be selectively varied to accommodate various row widths. The telescoping effect of each marker arm thus complements selectively variable extension of each marker arm in providing even greater flexibility in accommodating a wide range of crop row widths. Although not shown, this marker arm telescoping feature is also preferably incorporated in right marker arm 14.

Outward extension of marker arms 14, 16 is limited by spacer 44 contacting pivot bolt 36 as shown in FIGS. 3 and 4. With spacer 44 in contact with pivot bolt 36, further displacement of marker arm 16 is precluded with marker arm 16 thus firmly extended.

Referring to FIG. 4, the coupling between proximal section 16D and intermediate section, 16B is shown. Proximal and intermediate sections 16D, 16B are coupled by means of breakaway pivot pin 68 and shear pin 70 positioned in mounting apertures (not shown) located in adjacent end portions of each section. Intermediate and proximal sections 16B, 16D may be coupled in a hinged, telescoping manner by means of breakaway pivot pin 68 and shear pin 70, or in any conventional manner which would allow intermediate section 16B to freely pivot with respect to proximal section 16D while still remaining coupled thereto. The exact form of coupling between these two sections does not form a part of the present invention and will not be further discussed. However, in the preferred embodiment of the present invention, with the row marker system 10 moving in a downward direction in referring to FIG. 4, impact of left marker arm 16 with an obstruction will cause shear pin 70 to break allowing intermediate section 16B to freely pivot with respect to proximal section 16D about breakaway pivot pin 68. The broken away intermediate section 16E is shown in dotted line form including shear pin aperture 70A. This decoupling feature between two adjacent sections of a marker arm protects the marker arm from damage upon impact of the adjoining marker element with an obstruction. Following marker arm or marker element impact with a large obstruction and the breaking of shear pin 70, the adjacent marker arm sections may be realigned and a new shear pin inserted to restore the marker arm system to full operation.

A flexibly coupled marker arm will undergo the horizontal flexing as shown in FIG. 4 upon impact with a large obstruction. If, however, the marker element strikes a smaller obstacle such as a rock, the marker element and marker arm will be displaced in an upward direction. This, too, can result in marker row system damage or destruction. Consequently, provision may be made in the marker arm for allowing for the vertical displacement of the marker element. Shown in FIG. 3 is intermediate section 16B flexibly coupled to proximal section 16D. Upon impact of marker element 24 with an obstacle, marker element 24 and left marker arm 16 will be displaced upward causing the intermediate section to be pivotally decoupled from proximal section 16D as shown in dotted line form as element 16A. The vertically hinged coupling between adjacent sections as shown in FIG. 3 may be conventional in nature and may, in fact, be identical to the horizontally hinged coupling between adjacent sections as discussed with reference to FIG. 4.

There has thus been provided an agricultural row marking apparatus for the accurate positioning of ground working implements relative to crop rows. The telescoping positioning of right and left marker arms in a conventional hollow horizontal support member of a planter or a cultivator improves farm implement transportability and maneuverability, enhances implement ground contour following and provides for safer, more reliable farm implement operation.

While particular embodiments of the present invention have been shown and described, it will be apparent to those skilled in the art that changes and modifications may be made therein without departing from the invention in its broader aspects. The aim of the appended claims, therefore, is to cover all such changes and modifications as fall within the true spirit and scope of the invention.

I claim:

1. A row marker for use with a tillage apparatus having a single hollow support member open at both ends and extending generally horizontally and transversely to the direction of travel of said tillage apparatus, said row marker comprising:

first and second arms positioned within said hollow support member and having distal and proximal ends and adapted to be linearly displaced along said hollow support member so as to extend from a respective open end thereof;

marker means positioned on the distal ends of each of said first and second arms for marking a lateral displacement from a crop row;

first and second independent rotary drive means each positioned within and adjacent respective open ends of said support member and in cooperative engagement with said first and second arms, respectively, for linearly extending said arms from said support member or for retracting said arms into said support member; and first and second hinged guides each positioned adjacent respective ends of said support member and communicating respectively with said first and second arms in providing a retaining force against said arms for maintaining said arms in cooperative engagement with said respective first and second drive means.

2. A row marker as set forth in claim 1 wherein said first and second hinged guides each include roller means in rotational engagement with a respective arm for facilitating the extension and retraction thereof.

3. A row marker as set forth in claim 1 wherein said first and second arms each include a plurality of apertures in a linear array integral with and forming a track lengthwise on the surface and substantially over the entire length thereof for engaging said first and second drive means, respectively.

4. A row marker as set forth in claim 3 wherein said first and second drive means each include a sprocket having a plurality of teeth positioned around the periphery thereof for engagement with the apertures on the surfaces of said first and second arms, respectively.

5. A row marker as set forth in claim 4 wherein said first and second drive means each further includes a bidirectional hydraulic motor energized by a source of hydraulic pressure and coupled to a respective sprocket for the rotation thereof.

6. A row marker for use with a tillage apparatus having a single hollow support member open at both ends and extending generally horizontally and transversely to the direction of travel of said tillage apparatus, said row marker comprising:

first and second arms positioned within said hollow support member and having distal and proximal ends and adapted to be linearly displaced along said hollow support member so as to extend from a respective open end thereof and wherein the proximal ends of said first and second arms overlap when said arms are in a retracted position in said hollow support member, with the proximal end of said second arm including an inclined surface thereon for directing said first arm in position above and resting upon said second arm when said arms overlap in said retracted position;

marker means positioned on the distal ends of each of said first and second arms for marking a lateral displacement from a crop row; and first and second independent rotary drive means each positioned within and adjacent respective open ends of said support member and in cooperative engagement with said first and second arms, respectively, for linearly extending said arms from said support member or for retracting said arms into said support member.

7. A row marker as set forth in claim 6 wherein said first arm includes guide means coupled to the proximal end thereof for directing the proximal end of said first arm onto the inclined proximal surface of said second arm in facilitating the positioning of said first arm on said second arm in said retracted position.

8. A row marker as set forth in claim 7 wherein said guide means comprises a leaf spring fixedly coupled to the proximal end of said first arm and extending downward therefrom for maintaining the proximal end of said first arm in a raised position in said hollow support member.

9. A row marker as set forth in claim 8 further including spacer means mounted to the upper surfaces of each of said first and second arms for maintaining vertical displacement therebetween when said arms overlap in a retracted position.

10. A row marker for use with a tillage apparatus having a single hollow support member open at both ends and extending generally horizontally and transversely to the direction of travel of said tillage apparatus, said row marker comprising:
  first and second arms positioned within said hollow support member and having distal and proximal ends and adapted to be linearly displaced along said hollow support member so as to extend from a respective open end thereof and wherein said first and second arms each include a first roller positioned on an upper surface and adjacent the proximal end thereof for rotationally engaging an upper inner surface of said hollow support member in facilitating the extension and retraction of said first and second arms;
  marker means positioned on the distal ends of each of said first and second arms for marking a lateral displacement from a crop row; and
  first and second independent rotary drive means each positioned within and adjacent respective open ends of said support member and in cooperative engagement with said first and second arms, respectively, for linearly extending said arms from said support member of for said first and second arms, respectively, for linearly retracting said arms into said support member.

11. A row marker as set forth in claim 10 wherein said first and second arms each further include a second roller positioned on a first lateral surface and adjacent the proximal end thereof for rotationally engaging a first lateral inner surface of said hollow support member in facilitating the extension and retraction of said first and second arms.

12. A row marker as set forth in claim 11 wherein a second lateral inner surface of said hollow support member includes third and fourth rollers each coupled to a respective end portion thereof for rotationally engaging a second lateral surface of a respective arm in facilitating the extension and retraction of said first and second arms, wherein the first lateral surfaces of said bars and said hollow support member are in facing relation to the respective second lateral surfaces thereof.

13. A row marker for use with a tillage apparatus having a single hollow support member open at both ends and extending generally horizontally and transversely to the direction of travel of said tillage apparatus, said row marker comprising:
  first and second arms positioned within said hollow support member and having distal and proximal ends and adapted to be linearly displaced along said hollow support member so as to extend from a respective open end thereof and wherein a proximal portion of each of said first and second arms includes a horizontally hinged section permitting the distal end of each arm to be displaced in a direction opposite to the direction of travel of said tillage apparatus upon impact of a respective marker means coupled thereto with an obstacle;
  marker means positioned on the distal ends of each of said first and second arms for marking a lateral displacement from a crop row; and
  first and second independent rotary drive means each positioned within and adjacent respective open ends of said support member and in cooperative engagement with said first and second arms, respectively, for linearly extending said arms from said support member or for retracting said arms into said support member.

* * * * *

UNITED STATES PATENT AND TRADEMARK OFFICE
CERTIFICATE OF CORRECTION

PATENT NO. : 4,467,872
DATED : August 28, 1984
INVENTOR(S) : Gary D. Hodapp

It is certified that error appears in the above—identified patent and that said Letters Patent is hereby corrected as shown below:

Column 9, lines 42 and 43, delete "of for said first and second arms, respectively, for linearly" and insert -- or for --.

Signed and Sealed this

Twenty-ninth Day of January 1985

[SEAL]

Attest:

DONALD J. QUIGG

Attesting Officer    Acting Commissioner of Patents and Trademarks